US009075721B2

(12) United States Patent
Tamura

(10) Patent No.: US 9,075,721 B2
(45) Date of Patent: Jul. 7, 2015

(54) COMPUTER READABLE RECORDING MEDIUM HAVING STORED THEREIN INFORMATION PROCESSING PROGRAM, INFORMATION PROCESSING APPARATUS AND INFORMATION PROCESSING METHOD

(71) Applicant: FUJITSU LIMITED, Kawasaki-shi (JP)

(72) Inventor: Hidetaka Tamura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 215 days.

(21) Appl. No.: 13/775,317

(22) Filed: Feb. 25, 2013

(65) Prior Publication Data
US 2013/0166814 A1 Jun. 27, 2013

Related U.S. Application Data

(63) Continuation of application No. PCT/JP2010/064969, filed on Sep. 1, 2010.

(51) Int. Cl.
*G06F 12/08* (2006.01)
*G06F 9/455* (2006.01)
(Continued)

(52) U.S. Cl.
CPC ........ *G06F 12/0802* (2013.01); *G06F 9/45533* (2013.01); *G06F 9/461* (2013.01); *G06F 9/5077* (2013.01); *G06F 12/1009* (2013.01); *G06F 12/109* (2013.01); *G06F 2009/45583* (2013.01)

(58) Field of Classification Search
CPC ............ G06F 11/1451; G06F 11/2064; G06F 11/2082; G06F 12/00; G06F 12/12; G06F 12/08; G06F 12/122; G06F 12/02; G06F 12/10; G06F 12/0238; G06F 17/30215; G06F 17/30578; G06F 2201/84
See application file for complete search history.

(56) References Cited

U.S. PATENT DOCUMENTS 6,243,788 B1   6/2001   Franke et al.
7,000,072 B1   2/2006   Aisaka et al.
(Continued)

FOREIGN PATENT DOCUMENTS

JP   2000-148518   5/2000
JP   2001-109661   4/2001
(Continued)

OTHER PUBLICATIONS

Notification of Transmittal of Translation of the International Preliminary Report on Patentability (Form PCT/IB/338, Form PCT/IB/373 & Form PCT/ISA/237), International Application No. PCT/JP2010/064969, 6 pages, dated Apr. 25, 2013.
(Continued)

*Primary Examiner* — Jared Rutz
*Assistant Examiner* — Jean Edouard
(74) *Attorney, Agent, or Firm* — Fujitsu Patent Center

(57) ABSTRACT

A program for causing an information processing apparatus to execute a process of a virtual calculator, the process including judging, when a switching of a virtual address space being a processing target of a virtual calculation apparatus occurs, whether or not a there exits physical calculation apparatus in which cache information of a physical address space corresponding to a virtual address space of a switching destination is accumulated; selecting the physical calculation apparatus when there exists a physical calculation apparatus in which the cache information of the physical address space is accumulated, and selecting the physical calculation apparatus in which cache information itself is not accumulated when there exists no physical calculation apparatus in which the cache information is accumulated; and assigning the selected physical calculation apparatus to the virtual calculation apparatus in which the switching of the virtual address space being a processing target has occurred.

5 Claims, 10 Drawing Sheets

(51) Int. Cl.
  *G06F 9/46* (2006.01)
  *G06F 9/50* (2006.01)
  *G06F 12/10* (2006.01)

(56) References Cited

U.S. PATENT DOCUMENTS

| | | | |
|---|---|---|---|
| 7,734,900 B2 * | 6/2010 | Farrell et al. | 712/225 |
| 7,739,434 B2 * | 6/2010 | Farrell et al. | 710/104 |
| 2006/0075207 A1 * | 4/2006 | Togawa et al. | 711/202 |
| 2006/0282624 A1 * | 12/2006 | Yokota | 711/147 |
| 2007/0226449 A1 * | 9/2007 | Akimoto | 711/170 |
| 2009/0164991 A1 * | 6/2009 | Takashige et al. | 718/1 |
| 2009/0182915 A1 * | 7/2009 | Farrell et al. | 710/104 |

FOREIGN PATENT DOCUMENTS

| | | |
|---|---|---|
| JP | 2006-127462 | 5/2006 |
| JP | 2006-350531 | 12/2006 |
| JP | 2007-257097 | 10/2007 |
| JP | 2009-151650 | 7/2009 |

OTHER PUBLICATIONS

International Search Report, mailed in connection with PCT/JP2010/064969 and mailed Mar. 8, 2011.

* cited by examiner

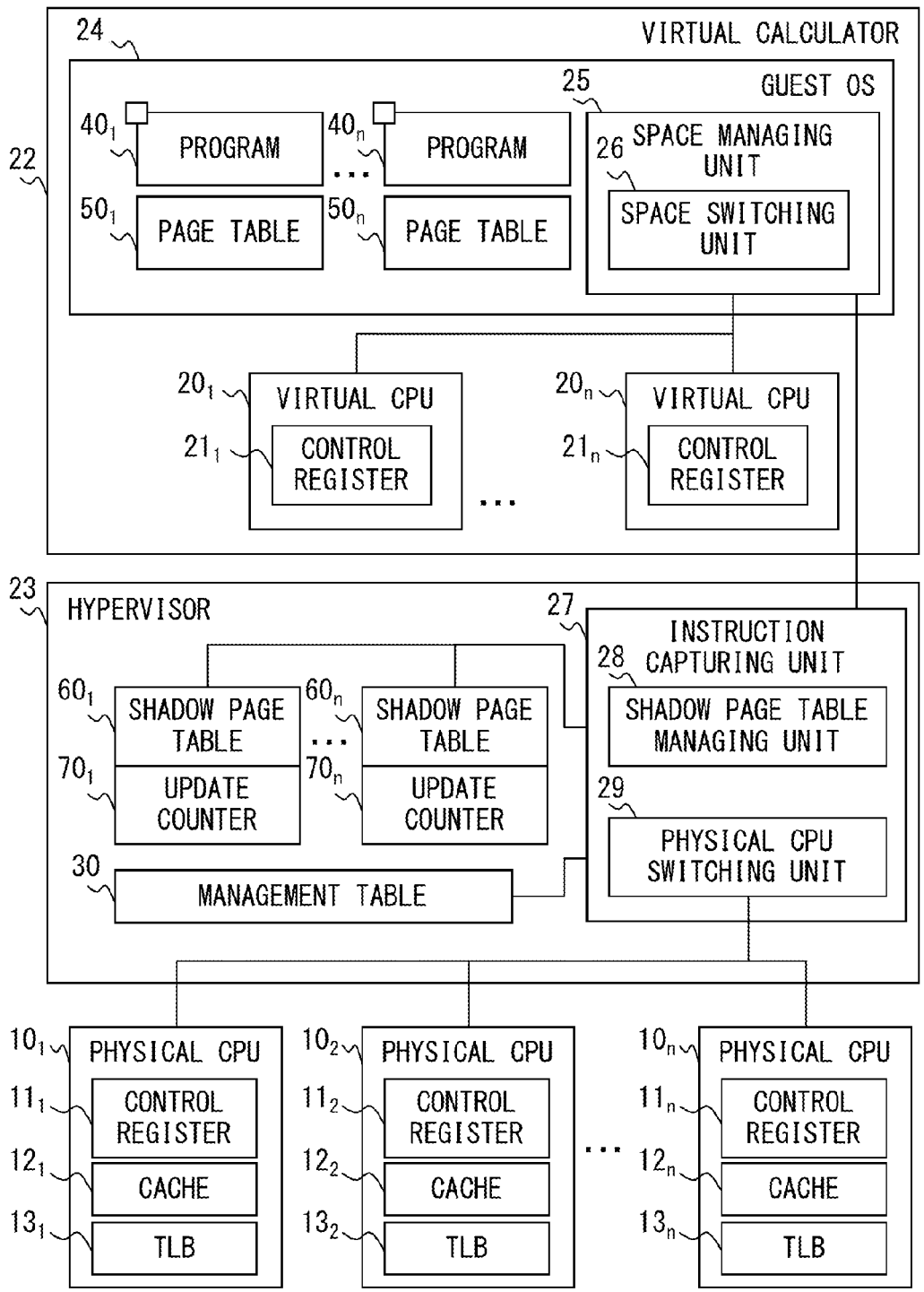
F I G. 2

| PHYSICAL CPU | SHADOW PAGE TABLE ADDRESS | UPDATE COUNTER | USAGE CONDITION |
|---|---|---|---|
| PHYSICAL CPU $10_1$ | 0x0DD0F000 (SHADOW PAGE TABLE $50_1$) | 3 | ASSIGNED |
| PHYSICAL CPU $10_2$ | 0x0DF00000 (SHADOW PAGE TABLE $50_2$) | 1 | USED |
| ⋮ | ⋮ | ⋮ | ⋮ |
| PHYSICAL CPU $10_n$ | NOT SET | NOT SET | UNUSED |

F I G. 3

| PHYSICAL CPU | SHADOW PAGE TABLE ADDRESS | UPDATE COUNTER | USAGE CONDITION |
|---|---|---|---|
| PHYSICAL CPU $10_1$ | 0x0DD0F000 (SHADOW PAGE TABLE $50_1$) | 3 | ASSIGNED |
| PHYSICAL CPU $10_2$ | NOT SET | NOT SET | UNUSED |
| ⋮ | ⋮ | ⋮ | ⋮ |
| PHYSICAL CPU $10_n$ | NOT SET | NOT SET | UNUSED |

FIG. 6A

| PHYSICAL CPU | SHADOW PAGE TABLE ADDRESS | UPDATE COUNTER | USAGE CONDITION |
|---|---|---|---|
| PHYSICAL CPU $10_1$ | 0x0DD0F000 (SHADOW PAGE TABLE $50_1$) | 3 | USED |
| PHYSICAL CPU $10_2$ | 0x0D F00000 (SHADOW PAGE TABLE $50_2$) | 0 | ASSIGNED |
| ⋮ | ⋮ | ⋮ | ⋮ |
| PHYSICAL CPU $10_n$ | NOT SET | NOT SET | UNUSED |

FIG. 6B

| PHYSICAL CPU | SHADOW PAGE TABLE ADDRESS | UPDATE COUNTER | USAGE CONDITION |
|---|---|---|---|
| PHYSICAL CPU $10_1$ | 0x0DD0F000 (SHADOW PAGE TABLE $50_1$) | 3 | ASSIGNED |
| PHYSICAL CPU $10_2$ | 0x0DF00000 (SHADOW PAGE TABLE $50_2$) | 0 | USED |
| ⋮ | ⋮ | ⋮ | ⋮ |
| PHYSICAL CPU $10_n$ | NOT SET | NOT SET | UNUSED |

F I G. 6 C

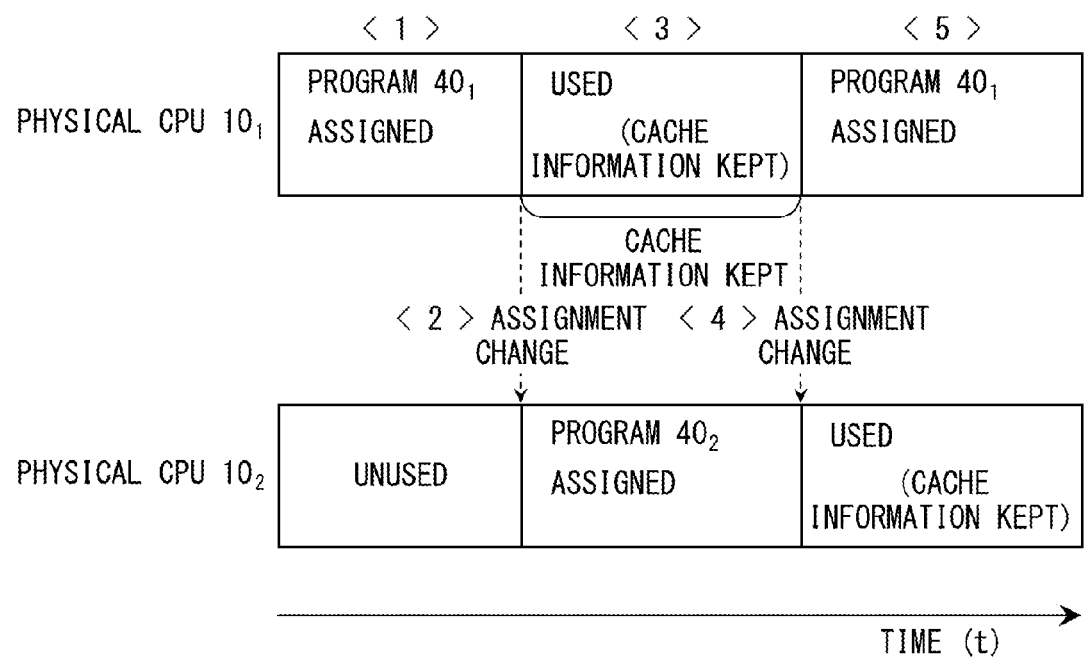
F I G. 7 A

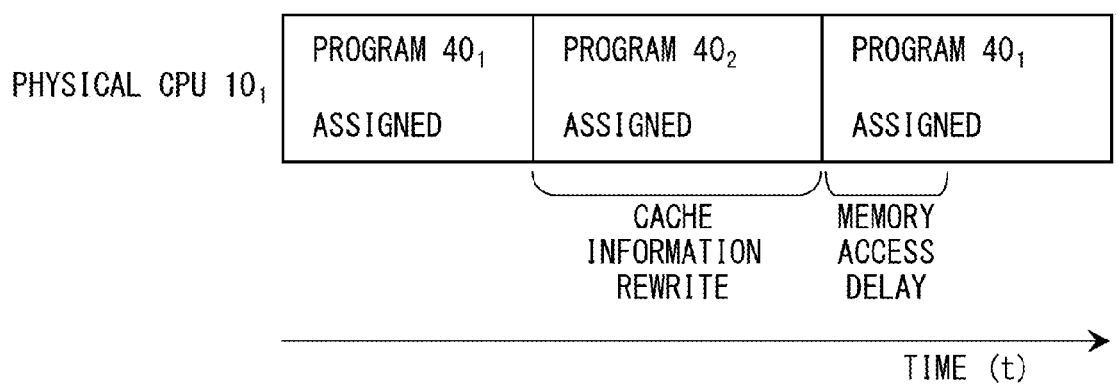
F I G. 7 B

COMPUTER READABLE RECORDING MEDIUM HAVING STORED THEREIN INFORMATION PROCESSING PROGRAM, INFORMATION PROCESSING APPARATUS AND INFORMATION PROCESSING METHOD

CROSS-REFERENCE TO RELATED APPLICATIONS

This application is a continuation application of International Application PCT/JP2010/064969 filed on Sep. 1, 2010 and designed the U.S., the entire contents of which are incorporated herein by reference.

FIELD

The present invention relates to a technique to assign a physical CPU to a virtual CPU of a virtual machine set up in an information processing apparatus.

BACKGROUND

In an information apparatus to which the technique of the VM: Virtual machine is applied, a guest OS being a virtual OS (Operating System) operates on a hypervisor. The guest OS performs the processing of a program using a virtual CPU to which a physical CPU (Central Processing Unit) is virtually assigned.

As an example of the technique to assign a physical CPU to a virtual CPU, a technique to use an address conversion table that determines the correspondence between a logic processor (virtual CPU) and a physical processor (physical CPU) has been proposed. Specifically, in the proposed technique, a table representing the correspondence between the logic partition address space that the logic processor is able to access and the logical address space, and a table representing the correspondence between the virtual address space that the guest OS included in the logic partition and the physical address space, is able to use directly are set. Then, the control OS (hypervisor) updates these tables arbitrarily according to the situation, making possible to realize the switching of the correspondence between the logic processor and the physical processor without making the guest OS recognize the switching of the physical processor.

Meanwhile, as another technique, a technique that enables, in a time sharing an access from the guest OS to MMIO (memory mapped IO) register information even in a condition in which no physical processor is assigned to a logic processor has been proposed. Specifically, in this technique, copy information of the MMIO register corresponding to the logic processor is held in the memory in both the condition in which a physical processor is assigned to the logic processor corresponding to the guest OS and the condition in which no physical processor is assigned to the logic processor. Accordingly, the guest OS is always able to access to the information of the MMIO register, making it possible to avoid processing delay.

Here, in the technique to assign a physical CPU to a virtual CPU to realize the program processing in the guest OS, when a switching of the virtual address space being the processing target of the virtual CPU, the hypervisor has performed the following process. That is, the hypervisor has switched the physical address space of the processing target of the physical CPU assigned currently to the virtual CPU in tandem with the switching of the virtual address space being the processing target of the virtual CPU.

Patent Document 1: Japanese Laid-open Patent Publication No. 2006-127462
Patent Document 2: Japanese Laid-open Patent Publication No. 2006-350531

SUMMARY

The present technique includes a computer readable recording medium having stored therein a program for causing an information processing apparatus including a plurality of physical calculation apparatuses to execute a process of a virtual calculator assigning the plurality of physical calculation apparatuses to one or more virtual calculation apparatuses, the process including judging, when a switching of a virtual address space being a processing target of a virtual calculation apparatus occurs, whether or not a there exits physical calculation apparatus in which cache information of a physical address space corresponding to a virtual address space of a switching destination is accumulated, among the plurality of physical calculation apparatuses; when there exists a physical calculation apparatus in which the cache information of the physical address space is accumulated, selecting the physical calculation apparatus, and when there exists no physical calculation apparatus in which the cache information of the physical address space is accumulated, selecting a physical calculation apparatus in which cache information itself is not accumulated; and assigning the selected physical calculation apparatus to the virtual calculation apparatus in which the switching of the virtual address space being a processing target has occurred.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is an example of a function block diagram related to the CPU assigning process.

FIG. 3 is an illustration diagram of an example of a management table.

FIG. 6A-FIG. 6C are illustration diagrams of the contents of a management table in a specific example.

FIG. 7A and FIG. 7B are illustration diagrams representing the transition of the process condition of a physical CPU in a specific example.

DESCRIPTION OF EMBODIMENTS

Figure 1:
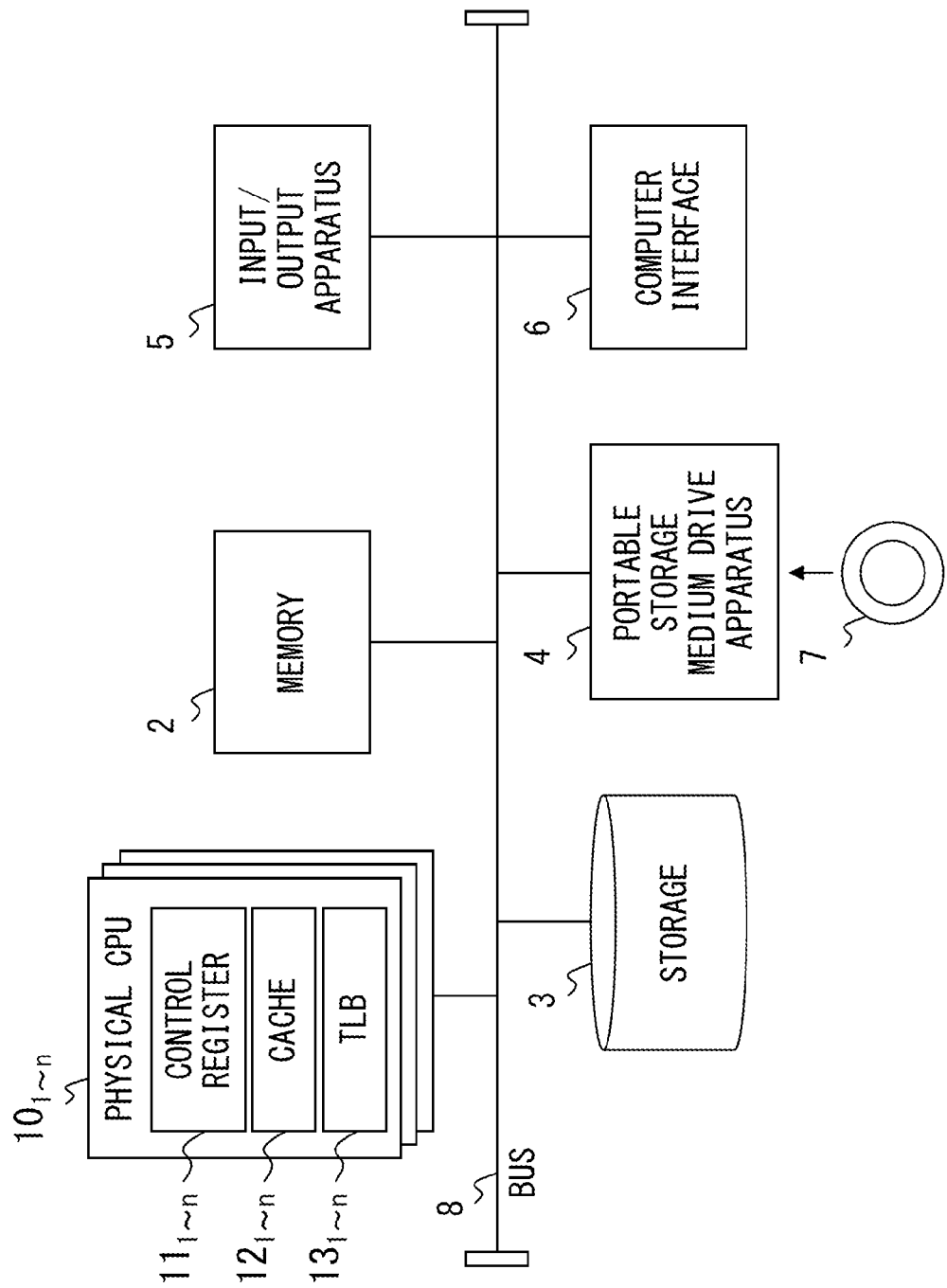
FIG. 1 is an illustration diagram of an example of the hardware configuration of an information processing apparatus.

However, when the switching of the physical address space is repeated while the same physical CPU is assigned to the virtual CPU, there is a problem as below. For example, even when the physical address space after the switching is a physical address space that the physical CPU has processed before, if processing of another physical address space is performed in the physical CPU after that, cache information of the physical address space after the switching is obviously not left. For this reason, there has been a problem that, until at least the cache information of the physical address space after the switching is accumulated in the physical CPU again, the memory access efficiency decreases.

In view of the above problem, an objective of the present technique is to reduce the decrease in the memory access efficiency in the physical CPU by performing the assignment of the physical CPU appropriately when switching the virtual address space that becomes the processing target of the virtual CPU.

The technique described herein is for improving the processing efficiency by devising the assignment of the physical CPU to the virtual CPU on a virtual calculator, in an information processing apparatus in which a plurality of physical CPU are provided and the virtual calculator where a guest OS operates on a hypervisor is established. According to the present technique, it becomes possible to reduce the decrease in the memory access efficiency in the physical CPU.

When the guest OS switches the virtual address space that is processed by the virtual CPU, conventionally, the hypervisor has performed the following process in tandem with the switching process. That is, the hyper visor has switched the physical address space (assumed as a first physical address space) being the processing target of the physical CPU (assumed as the first physical CPU) that has been assigned to the virtual CPU so far in tandem with the switching of the virtual address space. For this reason, even when the first physical address space becomes the processing target again with a further switching of the virtual address space, cache information of the first physical address space accumulated in the first physical CPU has already been lost.

However, in the technique described here, the hypervisor performs the following process. That is, the hypervisor does not simply switch the physical address space being the processing target of the first physical CPU, but selects another physical CPU (assumed as a second physical CPU) in which no cache information is accumulated in the cache and TLB and assign it to the virtual CPU. For this reason, in the first physical CPU, the cache information of the first physical address space is kept. Then, when the virtual address space corresponding to the first physical address space becomes the processing target of the virtual CPU again, the hypervisor selects the first physical CPU in which the cache information of the first physical address space is accumulated, and assigns it to the virtual CPU. Accordingly, it becomes possible to reuse the cache information of the physical address space accumulated in the cache and TLB of the first physical CPU. For this reason, after the switching of the virtual address space, it becomes possible to reduce memory access delay of the physical CPU generated before the cache information of the physical address corresponding to the virtual address space is accumulated in the physical CPU as a whole.

FIG. 1 illustrates an example of the hardware configuration of an information processing apparatus in which such a technology is materialized. The information processing apparatus in FIG. 1 includes a plurality of physical CPUs (Central Processing Unit) $10_{1-n}$, a memory 2, storage 3, a portable storage medium drive apparatus 4, an input/output apparatus 5 and a communication interface 6. Meanwhile, in the explanation below, a description physical CPU 10, for example, represents any one element of the physical CPU $10_{1-n}$, as an example (the same explanation may be applied to other elements of the physical CPU $10_{1-n}$). The same applies to other constituent elements.

The physical CPU 10 includes a control unit, a calculation unit and an instruction decoder and the like, and an execution unit executes arithmetic/logic calculation using the calculation unit, according to a control signal output from the control unit in accordance with an instruction of a program decoded in the instruction decoder. The physical CPU 10 includes a control register 11 in which various information used for control is stored, a cache 12 that is able to temporarily store contents of the memory 2 and the like, and a TLB 13 that functions as a cache of the page table. Meanwhile, an address space refers to a memory area that is represented by a series of memory addresses. Then, the virtual address space represents a virtual address space that the virtual CPU accesses, and the physical address space represents an address space that the physical CPU accesses, being a physical address space corresponding to the virtual address. Meanwhile, cache information herein refers to information related to the address space, stored in the cache 12, the TLB 13 and the like. The physical CPU 10 is able to realize high-speed processing by using cache information stored in the cache 12 and the TLB 13 being able to be accessed at a higher speed than directly accessing the memory itself. Meanwhile, while in this embodiment, the explanation is made using an example in which a plurality of physical CPUs themselves are provided independently from each other, a plurality of CPU cores may also be provided as the configuration. A description that a plurality of CPU are provided herein is assumed to include a meaning that a plurality of CPU cores are provided.

The memory 2 is a RAM (Random Access Memory) and the like for example, being a main memory on which a program executed in the physical CPU 10 is loaded and stores data used for the processes in the physical CPU 10. Meanwhile, the storage 3 is an HDD (Hard Disk Drive) and a flash memory and the like, that stores a program and various data. The portable storage medium drive apparatus 4 is an apparatus that reads out data and programs stored in a portable storage medium 7. The portable storage medium 7 is for example a magnetic disk, an optical disk, a magneto-optical disk, or a flash memory and the like. Meanwhile, the physical CPU 10 executes the program stored in the storage 3 and the portable storage medium 7 while cooperating with the memory 2 and the storage 3. Meanwhile, the program that the physical 10 executes and the data being the access target may also be stored in another apparatus that is able to communicate with the information processing apparatus.

The input/output apparatus 5 is for example a keyboard and a display and the like, that receives operation instructions by user manipulation and the like, while outputting a processing result by the information processing apparatus. The communication interface 6 is a LAN (Local Area Network) card and the like that enables external data communication. The respective constituent elements of the information processing apparatus described above are connected by a bus 8.

FIG. 2 is a function block diagram related to the CPU assignment function realized in such an information processing apparatus.

In the information processing apparatus, the virtual calculator 22 is established on the hypervisor 23. In other words, the guest OS 24 operates under the control of the hypervisor 23. Meanwhile, while FIG. 2 illustrates a case in which the number of the guest OS 24 is one, there may be a plurality of guest OS 24. The hypervisor 23 operates on the physical CPU $10_{1-n}$ as a lower layer of the guest OS 24.

The virtual calculator 22 includes one or more virtual CPUs $20_{1-n}$ that executes the respective processes above on the guest OS 24. As well as the physical CPU 10, the virtual CPU 20 also includes a control register 21. On the guest OS 24, a plurality of programs (processes) $40_{1-n}$ are executed, and the plurality of programs $40_{1-n}$ are executed while sharing one virtual CPU from the virtual CPUs $20_{1-n}$ with a time-sharing and so on. Furthermore, the combination of the plurality of programs $40_{1-n}$ may be processed in parallel at the same time in respectively separate virtual CPUs. In addition, page tables $50_{1-n}$ exist corresponding respectively to the $40_{1-n}$. The page table 50 associates and holds the logical address of the virtual address space in which data used when executing the program 40 is stored and the pseudo physical address.

Furthermore, the guest OS 24 includes a space managing unit 25 that manages the virtual address space being the processing target of the virtual CPUs $20_{1-n}$. The space managing unit 25 performs a process to update the page tables $50_{1-n}$ according to the update instruction of the space configuration of the virtual address space due to a memory acquisition event, a memory release event and the like. Meanwhile, when the update of the space configuration of the virtual address space is performed, it follows that the space configuration of the physical address space corresponding to the virtual address space is also updated, and the corresponding shadow page tables $50_{1-n}$ are also updated.

Meanwhile, the space managing unit 25 includes a space switching unit 26 that switches the virtual address space to be the processing target of the virtual CPUs $20_{1-n}$. When switching the virtual address space to be the processing target of the virtual CPUs 20, the space switching unit 26 substitutes the address of the page table 50 representing the switching target virtual address space into the control register 21 of the virtual CPU 20. Such a process occurs in a case in which, for example, the virtual CPU 20 is executing a plurality of programs by time sharing, when the processing target program is switched by dispatch or when the execution of a new program is started. At this time, the space switching unit 26 substitute the address of the page table 50 corresponding to the program 40 executed after the switching into the control register 21 of the virtual CPU 20.

The hypervisor 23 assigns the physical CPU 10 to the virtual CPU 20 as needed. Here, the hypervisor 23 includes shadow page tables $60_{1-n}$ that respectively correspond to the page tables $50_{1-n}$ and represents the physical address spaces that respectively correspond to the virtual address spaces that the page tables $50_{1-n}$ represent. In the shadow page table 60, the logical address and the physical address (the machine address that the physical CPU 10 is able to recognize) of the physical address are associated and stored. Meanwhile, the hypervisor 23 is obviously able to refer to information for identifying the shadow page table 60 corresponds to the page table 50 (not illustrated in the drawing). In addition, to the shadow page tables $60_{1-n}$, respectively, update counters $70_{1-n}$ in which the number of updates of the shadow page table 60 (that is, the corresponding page table 50) is set is associated.

Meanwhile, the hypervisor 23 includes an instruction capturing unit 27 that captures the update instruction of the page table 50 in the guest OS and the substitution instruction of the address of the page table 50 into the control register 21 of the virtual CPU 20. Then, the instruction capturing unit 27 includes a shadow page table managing unit 28 and a physical CPU switching unit 29.

When an update instruction for the page table 50 is captured, the shadow page table managing unit 28 makes the update contents reflected on the shadow page table 60 corresponding to the page table 50 being the update target. In addition, the shadow page table managing unit 28 counts up the update counter 70 corresponding to the shadow page table 60 at the time of reflecting the update contents.

When a substitution instruction of the address of the page table 50 into the control register 21 of the virtual CPU 20 is captured (that is, when a switching of the address space being the processing target of the virtual CPU 20 occurs), the physical CPU switching unit 29 performs the following process. That is, the physical CPU switching unit 29 selects the physical CPU 10 from the physical CPUs $10_{1-n}$ to assign to the virtual CPU 20, and assigns the selected physical CPU 10 to the virtual CPU 20. At this time, the physical CPU switching unit 29 substitutes the address of the shadow page table 60 corresponding to the page table 50 related to the substitution instruction into the control register 11 of the physical CPU 10 when needed. Meanwhile, the physical CPU switching unit 29 is an example of the embodiment of selection means and assignment means.

Here, the physical CPU switching unit 29 refers to a management table 30 in which data including information (in this embodiment, the address of the shadow page table set in the control register of the physical CPU) representing the physical address space related to cache information accumulated in the physical CPUs $10_{1-n}$. The management table 30 includes, as illustrated in FIG. 3, items including the physical CPU, the address of the shadow page table set in the control register of the physical CPU, the update counter of the shadow page table, the usage condition of the physical CPU. The management table 30 is stored in storage means such as the memory 2 or the storage 3 for example.

Here, the usage condition of the physical CPU set in the management table 30 is explained. As the usage condition of the physical CPU, the following three conditions are assumed.

"Assigned": the condition in which the CPU is assigned to a specific virtual CPU, and the condition in which the address of the shadow page table is set to the control register (that is, the condition in which the physical CPU is executing the processing of one of the programs and the cache information of the physical address space of the program is accumulated in the cache and TLB)

"Used": the condition in which the physical CPU is not assigned to any specific virtual CPU but the address of the shadow page table is set to the control register (that is, the physical CPU is not executing the processing of a program currently, but has at least executed the processing of one of the programs after the latest startup of the information processing apparatus, and the cache information of the physical address space of the program is accumulated in the cache and the TLB).

"Unused": the condition in which the physical CPU is not assigned to any virtual CPU, and the address of the shadow page table is not set to the control register (that is, the physical CPU has not executed any program yet at least after the latest startup of the information processing apparatus, and cache information itself of the physical address space is not accumulated in the cache and the TLB)

Next, in the respective constituent elements described above, especially the process executed by the shadow page table managing unit 28 and the physical CPU switching unit 29 of the instruction capturing unit 27 or the hypervisor 23 is explained in detail.

Figure 4:
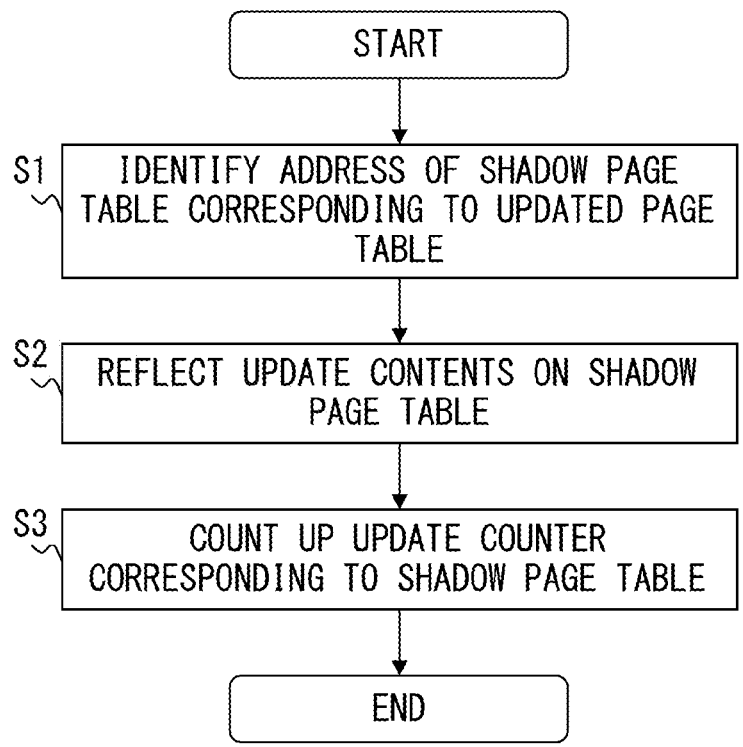
FIG. 4 is a flowchart of an example of the process of a shadow page table managing unit.

The flowchart in FIG. 4 illustrates the process of the shadow page table managing unit 28. The process in FIG. 4 is executed when the instruction capturing unit 27 captures an update instruction for the page table 50.

In step 1 (indicated as S1 in the drawing. The same applies below), the shadow page table managing unit 28 identifies the address of the shadow page table 60 corresponding to the page table 50 updated by the update instruction.

In step 2, the shadow page table managing unit 28 makes the contents of the update done for the page table 50 reflected on the shadow page table 60 identified in step 1.

In step 3, the shadow page table managing unit 28 counts up the update counter 70 provided corresponding to the updated shadow page table 60.

Meanwhile, such counting up of the update counter 70 is done for the following purpose. That is, in a case of the physical CPU of the x86 architecture and the like for example, when the space configuration of the physical address space is updated according to the update of the space configuration of the virtual address space, a process to substitute the address of the shadow page table into the control register of the physical CPU, and the to purge the TLB of the physical CPU is performed. In other words, when the space structure of the physical address space is updated, it is impossible to the cache information of the physical address space accumulated before the update in the cache and the TLB of the physical CPU. In this embodiment, the shadow page table managing unit 28 holds the number of updates of the shadow page table 60 by counting up the update counter 70 every time when the contents of the shadow page table 60 is updated (that is, the space structure of the physical address space is updated). Meanwhile, the physical CPU switching unit 20 identifies the presence/absence of the update of the shadow page table 60 based on the value of the update counter 70, in the physical CPU selection process described later. Then, the physical CPU switching unit 29 judges whether or not the cache information of the physical CPU holding the cache information of the address space represented by the shadow page table 60 is available. Meanwhile, such a process is not required when using a CPU of an architecture in which the case where the purging of the TLB of the physical CPU is performed with the change of the space configuration is not assumed.

Figure 5:
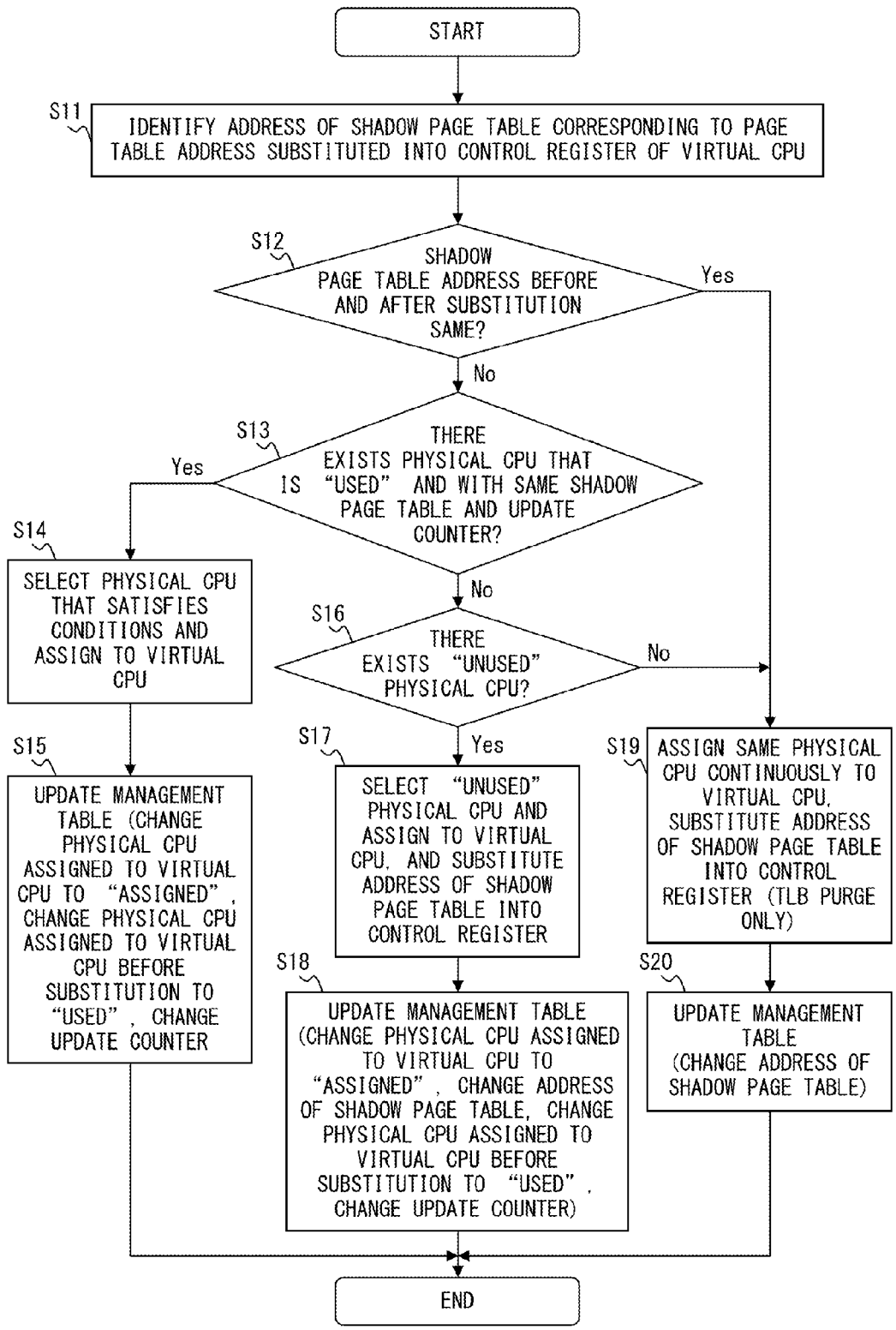
FIG. 5 is a flowchart of an example of a process of a physical CPU switching unit.

Next, using the flowchart in FIG. 5, the process of the physical CPU switching unit 29 is explained. The process in FIG. 5 is executed when the instruction capturing unit 27 captures a substitution instruction of the address of the page table 50 into the control register 21 of the virtual CPU 20. In other words, the process in FIG. 5 is executed when the switching of the virtual address space processed in the virtual CPU 20 occurs.

In step 11, the physical CPU switching unit 29 identifies the address of the shadow page table 60 corresponding to the address of the page table 50 related to the substitution instruction.

In step 12, the physical CPU switching unit 29 judges whether or not the address of the shadow page table 60 related to the substitution instruction is the same as the address of the shadow page table 60 substituted into the control register 11 of the physical CPU 10 to which the process is currently assigned. The physical CPU switching unit 29 moves the process forward to step 13 when they are not the same (No), and moves the process forward to step 19 when they are the same (Yes). Meanwhile, as the case in which they are the same, a case in which, for example, when a physical CPU of the x86 architecture is used, a substitution instruction of a page table simply to purge the TLB and the like is assumed.

In step 13, the physical CPU switching unit 29 refers to the management table 30 and judges whether or not there is a physical CPU 10 that satisfies the following conditions among the physical CPUs $10_{1-n}$.
(1) The usage condition of the management table is "Used"
(2) The shadow page table address of the management table is the same as the address of the shadow page table address related to the substitution instruction
(3) The update counter of the management table is the same as the update counter of the shadow page table related to the substitution instruction The physical CPU 10 that satisfies these conditions (1)-(3) is in other words, a physical CPU 10 that satisfies the conditions (1) not assigned to any of the virtual CPUs $20_{1-n}$ currently, (2) the cache information of the physical address space corresponding to the virtual address space after switching is accumulated in cache 12 or the TLB 13, and (3) the space configuration of the physical address space is not updated since the point of time when the physical CPU processed the physical address space.

The physical CPU switching unit 29 moves the process forward to step 14 when there is a physical CPU that satisfies the conditions (1)-(3) above (Yes), while it moves the process forward to step 16 when there is no such physical CPU (No).

In step 14, the physical CPU switching unit 29 selects the physical CPU 10 that satisfies all the conditions (1)-(3) above. Then, the physical CPU switching unit 29 assigns the selected physical CPU 10 to the virtual CPU 20.

In step 15, the physical CPU switching unit 29 updates the management table 30. Specifically, the physical CPU switching unit 29 changes the usage condition of the record corresponding to the physical CPU 10 selected in step 14 among the records in the management table 30 from "Used" to "Assigned". Meanwhile, the physical CPU switching unit 29 changes the usage condition of the record corresponding to the physical CPU 10 assigned to the virtual CPU 20 before the assignment process in S14 among the records in the management table 30 from "Assigned" to "Used". Furthermore, the physical CPU switching unit 29 changes the update counter of the changed record to the current value of the update counter 70 corresponding to the shadow page table 60 that was the processing target before the assignment process in step 14 (before the switching of the address space).

In step 16, the physical CPU switching unit 29 refers to the management table 30, and judges whether or not there is a physical CPU 10 whose usage condition is "Unused". When there is a physical CPU 10 whose usage condition is "Unused", the physical CPU switching unit 29 moves the process forward to step 17 (Yes), while when there is no physical CPU 10 whose usage condition is "Unused", moves the process forward to step 19 (No).

In step 17, the physical CPU switching unit 29 selects the physical CPU 10 whose usage condition is "Unused". In other words, the physical CPU switching unit 29 selects the physical CPU 10 in which the address itself of the shadow page table 60 is not set to the control register 11 (that is, the cache information itself is not accumulated). Then, the physical CPU switching unit 29 assigns the selected physical CPU 10 to the virtual CPU 20. At this time, the physical CPU switching unit 29 substitutes the address of the shadow page table 60 related to the substitution instruction into the control register 11 of the physical CPU 10. In other words, when there is no physical CPU 10 that satisfies all the conditions (1)-(3) above, the physical CPU switching unit 20 assigns the physical CPU 10 in which the cache information is not accumulated with a higher priority than the physical CPU 10 that has been assigned to the virtual CPU 20 so far.

In step 18, the physical CPU switching unit 29 updates the management table 30. Specifically, the physical CPU switching unit 29 changes the address of the shadow page table 60 of the physical CPU 10 selected in step 17 among the records in the management table 30 into the address of the shadow page table 60. In addition, the physical CPU switching unit 29 changes the usage condition of the record in which the address of the shadow page table 60 has been changed from "Unused" to "Assigned". In addition, the physical CPU switching unit 29 changes the update counter of the record in which the address of the shadow page table 60 into the current value of the update counter 70 corresponding to the shadow page table 60 related to the substitution instruction. Meanwhile, the physical CPU switching unit 29 change the usage condition of the record corresponding to the physical CPU 10 that was assigned to the virtual CPU 20 before the assignment process in S17 among the records in the management table 30 from "Assigned" to "Used". In addition, the update counter of the record in which the address of the shadow page table 60 has been changed is changed to the current value of the update counter 70 corresponding to the shadow page table 60 that was the processing target before the assignment process in S17 (before the switching of the address space).

In step 19, the physical CPU switching unit 29 substitutes the address of the shadow page table 60 related to the substitution instruction into the control register 11 of the physical CPU 10 that has been assigned to the virtual CPU 20 so far. That is, the physical CPU switching unit 29 assigns the physical CPU 10 that has been assigned to the virtual CPU 20 so far continuously to the virtual CPU 20.

In step 20, the physical CPU switching unit 29 updates the management table 30. Specifically, the physical CPU switching unit 29 changes the address of the shadow page table of the physical CPU 10 to be assigned continuously to the virtual CPU 20 in step 19 among the records in the management table 30 to the address of the shadow pate table 60 related to the substitution instruction. In addition, the update counter of the record in which the address of the shadow page table 60 is changed to the current value of the update counter 70 corresponding to the shadow page table related to the substitution instruction.

According to such a process, when the switching of the virtual address space processed by the virtual CPU occurs, the assignment of the physical CPU is performed as follows. That is, when there is a physical CPU in which the address of the shadow page table of the physical address space corresponding to the virtual address space of the switching destination is substituted into the control register, the physical CPU is assigned to the virtual CPU. Here, the physical CPU in which the address of the shadow page table of the physical address space corresponding to the virtual address space of the switching destination is substituted into the control register is, in other words, the physical CPU in which the cache information of the physical address space corresponding to the virtual address of the switching destination is accumulated in the cache or the TLB. For this reason, it becomes possible to use the cache information accumulated in the physical CPU in the process after the virtual address space switching, making it possible to reduce delay in the memory access process of the physical CPU after the virtual address space switching.

Meanwhile, on the other hand, in the record in the management table corresponding to the physical CPU that has been assigned to the virtual CPU so far, the address of the shadow page table before the switching is stored, and its usage condition is not unused by used. Therefore, a physical CPU that has been assigned to the virtual CPU is not selected to be assigned for the processing of another physical address space. For this reason, the cache information accumulated in the physical CPU is held without being rewritten with the cache information of another physical address space. Then, when the physical address space becomes the processing target next, as described above, the physical CPU is selected and assigned to the virtual CPU. For this reason, when the same physical address space becomes the processing target, the cache information accumulated in the physical CPU is utilized, making it possible to reduce the delay in the memory access process.

Furthermore, when there is no physical CPU in which the address of the shadow page table of the physical address space of the switching target is substituted into the control register, an unused physical CPU is assigned to the virtual CPU. Immediately after the assignment process, no cache information is accumulated of the physical address of the switching destination is accumulated in the cache or the TLB of the physical CPU assigned to the virtual CPU. However, once the physical CPU is assigned to the virtual CPU and cache information is accumulated, when the same physical address space becomes the processing target, the cache information accumulated in the physical CPU is utilized. As described above, as a result, the delay in the memory access may be reduced as a whole, while using a plurality of physical CPUs effectively.

Meanwhile, as described above, even when the hypervisor switches the physical CPU assigned to the virtual CPU according to the switching of the address space, it is recognized in the same manner as the switching of the address space so far on the guest OS side. Then, with the plurality of physical CPUs used for the process performed in one virtual CPU, even when there is an upper limit for the number of virtual CPUs available in the guest OS, the plurality of CPUs are utilized regardless of the upper limit.

Here, in the processes of the example described above, the assignment process of the physical CPU 10 to the virtual CPU 20 in a case in which a substitution instruction of the address space into the control register 21 of the virtual CPU 20 is executed, presenting a specific example.

FIG. 7A is an illustration diagram illustrating the transition of the processing condition of the physical CPU $10_{1-n}$ and the physical CPU $10_2$ according to the elapse of the time (t) in the specific example.

<1> In this specific example, it is assumed that, on the guest OS 24 operating in the virtual calculator 22 illustrated in FIG. 2, the program $40_1$ and the $40_2$ are executed alternatingly while sharing the virtual CPU $20_1$. At the current point of time, the processing target of the virtual CPU $20_1$ is the virtual address space of the program $40_1$, and into the control register $21_1$ of the virtual CPU $20_1$, the address of the page table $50_1$ is substituted. Meanwhile, to the virtual CPU $20_1$, the physical CPU $10_1$ is assigned, and to the control register $11_1$ of the physical CPU $10_1$, the address (0x0DD0F000) of the shadow page table $60_1$ corresponding to the page table $50_1$. At this time, the contents of the management table 30 are in the condition illustrated in FIG. 6A.

<2> Then, when the dispatch is performed from the program $40_1$ to the program $40_2$, the space switching unit 26 in the guest OS 24 performs the switching of the virtual address space being the processing target of the virtual CPU $20_1$. Specifically, the space switching unit 26 executes a substitution instruction to substitute the address of the page table $50_2$ that represents the address space of the program $40_2$ into the control register $21_1$ of the virtual CPU $20_1$.

Meanwhile, the instruction capturing unit 27 in the hypervisor 23 captures a substitution instruction of the address of the page table $50_2$ to the control register $21_1$ of such virtual CPU $20_1$. Then, the physical CPU switching unit 29 refers to the management table 30, and searches for the physical CPU 10, among the physical CPUs $10_{1-n}$, whose (1) usage condition is "Used", (2) shadow page table address is the address (0x0DF00000) of the shadow pate table $60_2$ corresponding to the page table $50_2$ representing the virtual address space of the program $40_2$ executed in the virtual CPU $20_1$ after the dispatch, and (3) update counter is the same as the update counter $70_2$ of the shadow page table $60_2$. Meanwhile, at this stage, it is assumed that the update counter $70_2$ is 0. Here, in the condition of the management table 30 illustrated in FIG. 6A, there is no physical CPU 10 that satisfies all the conditions (1)-(3). Therefore, the physical CPU switching unit 29 assigns the physical CPU $10_2$ whose usage condition is "Unused" to the virtual CPU $20_1$, to the control register $11_2$ of the physical CPU $10_2$, substitutes the address (0x0DF00000) of the shadow pate table $60_2$. Then, the physical CPU switching unit 29 changes the shadow page table address of the record of the physical CPU $10_2$ among the records in the management table 30 to the address (0x0DF00000) of the shadow pate table $60_2$, and changes its usage condition from "Unused" to "Assigned". Furthermore, the physical CPU switching unit 29 changes the usage condition of the record of the physical CPU $10_1$ to from "Assigned" to "Used". FIG. 6B illustrates the contents of the management table 30 after such update is performed.

<3> As a result of such a process, the physical CPU $10_2$ is assigned to the virtual CPU $20_1$, and the processing of the physical address space represented by the shadow page table $60_2$, that is, the processing of the program $40_2$ is executed. During the execution of the process, as described above, in the management table 30, the address (0x0DD0F000) of the shadow page table $60_1$ corresponding to the physical CPU $10_1$ is set in the shadow page table address of the record corresponding to the physical CPU $10_1$, and its usage condition is "Used". Therefore, the physical CPU $10_1$ is not assigned to the processing of other physical address space. Therefore, the cache $12_1$ or the TLB $13_1$ of the physical CPU $10_1$ keep holding the cache information of the address space of the shadow page table $60_1$.

<4> Then, when the dispatch from program $40_2$ to the program $40_1$ is performed again, the space switching unit 26 performs the switching of the virtual address space of the processing target of the virtual CPU $20_1$. Specifically, the space switching unit 26 substitutes the address of the page table $50_1$ representing the virtual address space of the program $40_1$ into the control register $21_1$ of the virtual CPU $20_1$.

Meanwhile, the instruction capturing unit 27 of the hypervisor 23 captures a substation instruction of the address into the control register $21_1$ of such virtual CPU $20_1$. Then, the physical CPU switching unit 29 refers to the management table 30, and searches for the physical CPU 10, among the physical CPUs $10_{1-n}$, whose (1) usage condition is "Used", (2) shadow page table address is the address (0x0DD0F000) of the shadow page table $60_1$ corresponding to the page table $50_1$ representing the virtual address space of the program $40_1$ executed in the virtual CPU $20_1$ after the dispatch, and (3) update counter is the same as the update counter $70_1$ of the shadow page table $60_1$. Meanwhile, at this stage, it is assumed that the update counter $70_1$ is 3. Here, based on the management table 30 illustrated in FIG. 6B, the physical CPU $10_1$ satisfies these conditions. Therefore, the physical CPU switching unit 29 assigns the physical CPU $10_1$ to the virtual CPU $20_1$, and changes the usage condition of the record of the physical CPU $10_2$ from "Assigned" to "Used" in records of the management table 30, while changing the usage condition of the record of the physical CPU $10_1$ from "Used" to "Assigned". FIG. 6C illustrates the contents of the management table 30 after such update is performed.

<5> As a result of such a process, the physical CPU $10_1$ is assigned to the virtual CPU $20_1$, and the processing of the physical address represented by the shadow page table $60_1$, that is, the processing of the program $40_1$ is performed again.

Here, FIG. 7B illustrates the processing condition of the physical CPU $10_1$ in a case in which the processing is performed using the physical CPU $10_1$ by the conventional CPU assignment method. According to the conventional CPU assignment method, after the dispatch from the program $40_1$ to the program $40_2$ occurs, when the dispatch to the program $40_1$ occurs again, the cache $12_1$ and TLB $13_1$ have already been rewritten to the cache information of the physical address space of the program $40_2$. Therefore, immediately after the dispatch to the program $40_1$, the cache information of the address space of the program $40_1$ is not accumulated in the cache $12_1$ and the TLB $13_1$, leading to the risk of delay in the memory access process.

On the other hand, returning to the explanation of <5> of FIG. 7A, when the physical CPU $10_1$ is assigned to the virtual CPU $20_1$ again, in the cache $12_1$ and the TLB $13_1$ of the physical CPU $10_1$, the cache information of the physical address space represented by the shadow page table $60_1$ is still kept.

For this reason, even immediately after the switching of the virtual address space, the physical CPU $10_1$ is able to the program $40_1$ using the cache information accumulated in the cache $12_1$ and the TLB $13_1$. Therefore, even immediately after the dispatch to the program $40_1$, the delay in the memory access is reduced.

Here, in each of the examples above, the physical CPU to be assigned to the virtual CPU is selected referring to the address of the shadow page table substituted into the control register and the usage condition of each physical CPU. However, the process to refer to the usage condition does not necessarily have to be performed. That is, when a physical CPU in the condition in which the address of the shadow page table of the physical address space corresponding to the virtual address space of the switching destination is set to the control register is successfully identified, depending on the structure of the guest OS, it may be possible to judge that the physical CPU is not being assigned to another virtual CPU. Therefore, without necessarily referring to the usage condition of the physical CPU, the physical CPU may be selected on a condition that the address of the shadow page table of the physical address space corresponding to the virtual address space of the switching destination to the control register. Meanwhile, when the address of the shadow page table is not set to the control register of the physical CPU, it is necessarily identified that the physical CPU is in the unused condition. Thus, even if the physical CPU is selected based on the address of the shadow page table without referring to the usage condition, it is possible to select the physical CPU appropriately.

Furthermore, in the example above, the hypervisor uses the management table to manage the address of the shadow page table substituted into the control register and the usage condition of each physical CPU. Then, the hypervisor is able to check the cache information and the like of the physical CPU and select the physical CPU promptly at the time of the switching of the virtual address space, by referring to the data of such a management table. However, such management data does not necessarily have to be held in the format of a table. Furthermore, it is possible for the hypervisor to select the physical CPU by generating an interruption to each physical CPU to check the contents and the like of the control register of the physical CPU directly, and does not necessarily have to use the management data.

The functional configuration and the physical configuration of the information processing apparatus are not limited to the embodiment described above, and for example, and it is possible for the respective functions and physical sources to be integrated and implemented, or in an opposite manner, further dispersed and implemented.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer readable recording medium having stored therein a program for causing an information processing apparatus including a plurality of physical calculation apparatuses to execute a process of a virtual calculator assigning the plurality of physical calculation apparatuses to one or more virtual calculation apparatuses, the process comprising:
   judging, when a switching of a virtual address space being a processing target of a virtual calculation apparatus occurs, whether or not there exits exists a physical calculation apparatus in which cache information of a physical address space corresponding to a virtual address space of a switching destination is accumulated, among the plurality of physical calculation apparatuses;
   referring to data representing a physical address space related to cache information accumulated in each of the plurality of physical calculation apparatuses, the cache information being stored in a storing unit;
   when there exists the physical calculation apparatus in which the cache information of the physical address space is accumulated, selecting the physical calculation apparatus by using the data that is referred to, and when there exists no physical calculation apparatus in which the cache information of the physical address space is accumulated, selecting a physical calculation apparatus in which no cache information is accumulated from among the plurality of physical calculation apparatuses by using the data that is referred to; and
   assigning the selected physical calculation apparatus to the virtual calculation apparatus in which the switching of the virtual address space being a processing target has occurred.

2. The non-transitory computer readable recording medium according to claim 1, the process further comprising:
   changing the physical address space represented by data corresponding to the selected physical calculation apparatus among the data to the physical address space corresponding to the virtual address space of the switching destination, to update the data when the physical calculation apparatus in which cache information itself is not accumulated is selected by the process of selecting the physical calculation apparatus.

3. The non-transitory computer readable recording medium according to claim 1, the process further comprising:
   updating an update counter representing a number of updates of a space configuration of a physical address space corresponding to the virtual address space when a space configuration of the virtual address space is updated, and storing a value of the update counter of a space configuration of the physical address space that was a processing target before the physical calculation apparatus was assigned to the virtual calculation apparatus, in a storing unit in association with the physical calculation apparatus when the physical calculation apparatus is assigned to the virtual calculation apparatus by the process of assigning to the virtual calculation apparatus, wherein
   the selecting of the physical calculation apparatus selects the physical calculation apparatus when there exists a physical calculation apparatus in which the cache information of the physical address space corresponding to the virtual address space of the switching destination is accumulated and when the value of the update counter stored in the storing unit in association with the physical calculation apparatus and a value of the update counter of a space configuration of a physical address space corresponding to the virtual address space of the switching destination are coincident.

4. An information processing apparatus including a plurality of physical calculation apparatuses and assigning the plurality of physical calculation apparatuses to one or more virtual calculation apparatuses to realize a process of a virtual calculator, the information processing apparatus comprising:
   a selecting unit that performs a process including
      judging, when a switching of a virtual address space being a processing target of a virtual calculation apparatus occurs, whether or not there exists a physical calculation apparatus in which cache information of a physical address space corresponding to a virtual address space of a switching destination is accumulated, among the plurality of physical calculation apparatuses,
      referring to data representing a physical address space related to cache information accumulated in each of the plurality of physical calculation apparatuses, the cache information being stored in a storing unit,
      when there exists a physical calculation apparatus in which the cache information of the physical address space is accumulated, selecting the physical calculation apparatus by using the data that is referred to, and when there exists no physical calculation apparatus in which the cache information of the physical address space is accumulated, selecting a physical calculation apparatus in which no cache information is accumulated from among the plurality of physical calculation apparatuses by using the data that is referred to; and
   an assigning unit that assigns the selected physical calculation apparatus to the virtual calculation apparatus in which the switching of the virtual address space being a processing target has occurred.

5. An information processing method comprising:
   by an information processing apparatus including a plurality of physical calculation apparatuses and assigning the plurality of physical calculation apparatuses to one or more virtual calculation apparatuses to realize a process of a virtual calculator,
   judging, when a switching of a virtual address space being a processing target of a virtual calculation apparatus occurs, whether or not there exists a physical calculation apparatus in which cache information of a physical address space corresponding to a virtual address space of a switching destination is accumulated, among the plurality of physical calculation apparatuses,
   referring to data representing a physical address space related to cache information accumulated in each of the plurality of physical calculation apparatuses, the cache information being stored in a storing unit;
   when there exists a physical calculation apparatus in which the cache information of the physical address space is accumulated, selecting the physical calculation apparatus by using the data that is referred to, and when there exists no physical calculation apparatus in which the cache information of the physical address space is accumulated, selecting a physical calculation apparatus in which no cache information is accumulated from among the plurality of physical calculation apparatuses by using the data that is referred to; and assigning the selected physical calculation apparatus to the virtual calculation apparatus in which the switching of the virtual address space being a processing target has occurred.

* * * * *